US012113662B1

(12) United States Patent
Lumpkins et al.

(10) Patent No.: US 12,113,662 B1
(45) Date of Patent: Oct. 8, 2024

(54) ASSOCIATION OF RELATED INCIDENTS TO A TELECOMMUNICATION NETWORK LARGE-SCALE EVENT

(71) Applicant: T-Mobile Innovations LLC, Overland Park, KS (US)

(72) Inventors: Robert D. Lumpkins, Marietta, GA (US); Brian D. Lushear, Winter Springs, FL (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/308,514

(22) Filed: Apr. 27, 2023

(51) Int. Cl.
*H04L 41/0604* (2022.01)
*H04L 41/50* (2022.01)

(52) U.S. Cl.
CPC ...... *H04L 41/0609* (2013.01); *H04L 41/0613* (2013.01); *H04L 41/5032* (2013.01)

(58) Field of Classification Search
CPC ............. H04L 41/0609; H04L 41/0613; H04L 41/5032
See application file for complete search history.

(56) References Cited

U.S. PATENT DOCUMENTS

| | | | |
|---|---|---|---|
| 6,420,968 B1* | 7/2002 | Hirsch | H04L 41/044 706/45 |
| 10,270,796 B1 | 8/2019 | Veeraswamy et al. | |
| 11,252,052 B1* | 2/2022 | Babu Balasubramani | H04L 41/0654 |
| 11,432,170 B1* | 8/2022 | Osinski | H04W 24/02 |
| 11,902,306 B1 | 2/2024 | Satish | |
| 12,057,994 B1 | 8/2024 | Gonzalez et al. | |
| 2007/0198695 A1* | 8/2007 | Engelmann | G06Q 10/087 709/224 |
| 2022/0107858 A1* | 4/2022 | Jain | G06F 11/0751 |

OTHER PUBLICATIONS

Gonzalez, Jose A. et al., "Telecommunication Network Large-Scale Event Root Cause Analysis," filed Jul. 14, 2023, U.S. Appl. No. 18/352,982.
"Maldonado, Ivan. et al., ""Large-Scale Event Detection Using Voronoi Cells,"" filed Sep. 7, 2023, U.S. Appl. No. 18/463,257."
Notice of Allowance dated Apr. 5, 2024, U.S. Appl. No. 18/352,982, filed Jul. 14, 2023.
Gonzalez, Jose A. et al., "Telecommunication Network Large-Scale Event Root Cause Analysis," filed Jul. 4, 2024, U.S. Appl. No. 18/764,150.

\* cited by examiner

*Primary Examiner* — Adnan M Mirza

(57) ABSTRACT

A telecommunication network management system. The system comprises an incident report management application that creates incident reports pursuant to alarms on network elements of a telecommunication network and wherein one of the incident reports is associated with a large-scale event (LSE), wherein the LSE incident report identifies alarms at a plurality of different network elements as associated with the LSE; and a network operation center (NOC) automation application that analyzes alarms on a plurality of network elements that are not yet associated with the LSE incident report and, based on analyzing a first alarm on a first network element of the plurality of network elements not yet associated with the LSE incident report, based on a location of the first network element, and based on the alarms associated with the LSE incident report, modifies the LSE incident report to associate the first alarm to the LSE.

14 Claims, 7 Drawing Sheets

ASSOCIATION OF RELATED INCIDENTS TO A TELECOMMUNICATION NETWORK LARGE-SCALE EVENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communication network operators build systems and tools to monitor their networks, to identify network elements (NE) that need maintenance, to assign maintenance tasks to personnel, and to fix network elements. Operational support systems (OSSs) may be provided by vendors of NEs to monitor and maintain their products. When trouble occurs in NEs, the OSS and/or the NEs may generate an alarm notification. An incident reporting system may be provided by the network operator to track incident reports which may be assigned to employees resolve one or more pending alarms. A network operation center (NOC) may provide a variety of workstations and tools for NOC personnel to monitor alarms, close incident reports, and maintain the network as a whole. It is understood that operating and maintaining a nationwide communication network comprising tens of thousands of cell sites and other NEs is very complicated.

SUMMARY

In an embodiment, a method of maintaining a communication network providing communication services to subscribers is disclosed. The method comprises receiving a first plurality of notifications of alarms active on a first plurality of network elements (NEs) by an incident management application executing on a first computer system; determining by the incident management application that some of the first plurality of notifications of alarms are associated with a large-scale event (LSE); and generating an LSE incident report that associates the some of the first plurality of notifications of alarms that are associated with the LSE to the LSE incident report. The method further comprises, after generating the LSE incident report, receiving a second plurality of notifications of alarms active on a second plurality of NEs by the incident management application; analyzing the second plurality of alarms by the incident management application; and determining by the incident management application that some of the second plurality of notifications of alarms are associated with the LSE. The method further comprises associating the some of the second plurality of notifications of alarms that are associated with the LSE to the LSE incident report and resolving the LSE incident report by fixing the NEs associated with the plurality of the notifications of alarms associated with the LSE to clear the alarms on the NEs, whereby the LSE incident report is resolved in a holistic manner.

In another embodiment, a telecommunication network management system is disclosed. The system comprises an incident reporting application executing on a first computer system, wherein the incident reporting application creates incident reports pursuant to alarms on network elements of a telecommunication network and wherein one of the incident reports is associated with a large-scale event (LSE), wherein the LSE incident report identifies alarms at a plurality of different network elements as associated with the LSE. The system also comprises an incident management application that executes on a second computer system, wherein the incident management application analyzes alarms on a plurality of network elements that are not yet associated with the LSE incident report, determines, based on analyzing a first alarm on a first network element of the plurality of network elements not yet associated with the LSE incident report, based on a location of the first network element, and based on the alarms associated with the LSE incident report, and modifies the LSE incident report to associate the first alarm to the LSE.

In yet another embodiment, a method of maintaining a communication network by associating incident reports associated with different network elements (NEs) to a large-scale event (LSE) is disclosed. The method comprises determining by an application executing on a computer system that a first plurality of alarms received from a first plurality of NEs are associated with the LSE based on an alarm identity of the first plurality of alarms and based on location of the first plurality of NEs; opening an incident report on the LSE; and associating the first plurality of alarms by the application to the incident report on the LSE. The method further comprises determining by the application that a first alarm associated with a first NE that is located within a boundary of the LSE is not related to the LSE based on an alarm identity of the first alarm; opening an incident report on the first alarm that is not associated with the LSE; determining by the application that a second alarm associated with a second NE that is located within the boundary of the LSE is related to the LSE based on an alarm identity of the second alarm; and associating the second alarm by the application to the incident report on the LSE.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
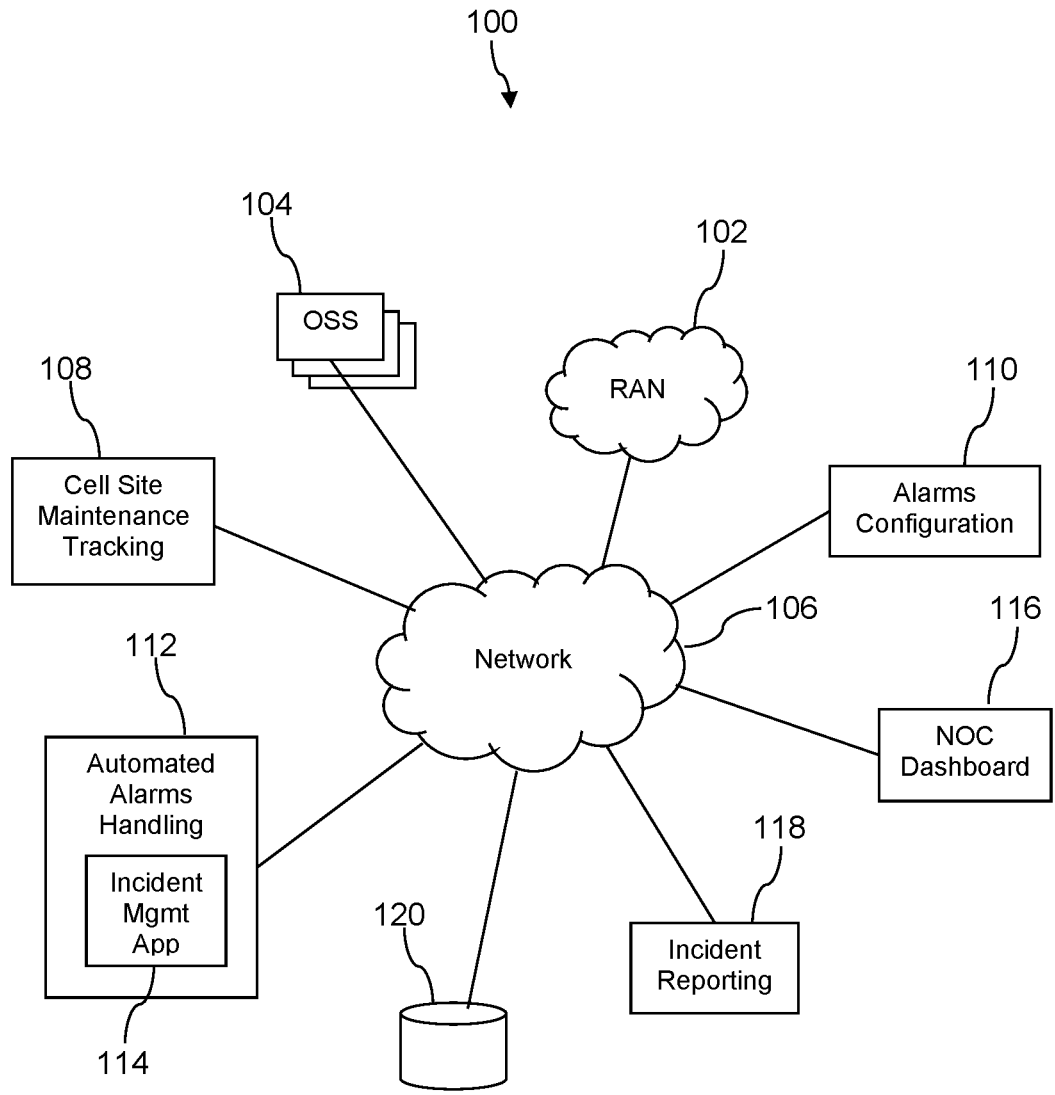
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Cell sites in a radio access network (RAN) may be subject to a variety of faults or failures which typically result in raising of alarms which are picked up by OSSs and propagated upwards to a central monitoring station such as a NOC. Sometimes different cell sites experience alarms that are traceable to a common cause, such as a severe weather event. It is desirable that such alarms be seen as related to the same event so that they can be resolved in a suitable and often uniform manner. Such an event may be referred to as a large-scale event (LSE). LSEs can be identified by automation such as a computer program or a script executing on a computer. The automation can define a set of rules or criteria that a set of alarms must satisfy to qualify as related to an LSE. This criteria may involve some combination of (A) identical alarms, (B) where the alarms are notified at about the same time (e.g., notified within a predefined time duration, where this predefined time duration may be increased later to accommodate the possibility that a LSE expands as time passes, for example as a storm passes through an area), and (C) where the alarms are associated with cell sites or other NEs located proximate to each other. When such an LSE is identified by automation, a master incident report can be generated that lists the related alarms, and a unified and/or coordinated process of handling the master incident report associated with the LSE can be launched.

In some instances, alarms may be related to an LSE but not initially satisfy the criteria for automatic association to the LSE. In this case, a separate incident report may be generated based on this alarm that doesn't reference the LSE (e.g., doesn't reference the master incident report associated with the LSE). This is undesirable, because this alarm and/or incident report may be assigned to a different person who then duplicates unknowingly some of the troubleshooting and fix actions of the person(s) assigned to address the master incident report associated with the LSE. This involves inefficiencies and may further result in uncoordinated, disparate repairs. The present disclosure teaches identifying such alarms as related to a previously identified LSE and consolidating the alarm and/or incident report with the master incident report associated with the LSE.

It is also desirable to associate alarms and/or incident reports to an LSE, when that is appropriate, to support various regulatory requirements on reporting communication service outages (for example, 911 service being unavailable temporarily). Proper association of alarms and/or incident reports to an LSE is also desirable when vendor equipment is involved: for example, an electric power company service, for example a backhaul link provided by a local exchange company (LEC) or alternative access vendors (AAVs), whereby to recover expenses from the vendor and to task a vendor with fixing the problems. On the other hand, it is preferred to not bulk assign alarms and/or incident reports to a current LSE by rote or by a simplistic criteria. The association of alarms and/or incident reports to LSEs is a technical problem that springs from automated, computer-based management of large telecommunication networks.

The present disclosure teaches a specific technical solution to the problem of correctly associating alarms and/or incident reports to LSEs. An incident management application can analyze alarms and/or incident reports not currently associated to an LSE (e.g., not associated to a master incident report associated with the LSE) and determine that they should be associated to the LSE. In this case, the incident management application can automatically associate the alarms and/or incident reports to the LSE by adding an association to the LSE in an alarm record and/or by linking the incident report as a child incident report to the master incident report associated with the LSE. In some contexts herein, a master incident report associated with an LSE may be referred to as an LSE master incident report. Correctly associating alarms and/or incident reports to an LSE master ticket can overcome the tendencies of large organizations from following a siloed approach to resolving alarms which wastes efforts of separated teams independently performing the same analysis on the related problem presented by an LSE.

In an embodiment, the incident management application may delay creating a ticket when an alarm notification is received, for example delay for 20 minutes, because sometimes alarms are automatically fixed by network management software. In the case of an LSE, the incident management application may associate an alarm to the LSE before the alarm is associated to its own incident report, thereby accelerating the process of addressing the alarm condition. The incident management application can comb through alarms and incident reports, determine they ought to be associated to an LSE, and make the appropriate reporting modifications. This can happen, for example, when initially an alarm and/or incident report is not sufficiently close to the boundary of an LSE to qualify as associated, but later generated alarms and/or incident reports located between the boundary of the LSE and the subject alarm and/or incident report are associated to the LSE, thereby expanding the defined scope of the LSE, and, after this redrawing of the LSE boundary, the subject alarm and/or incident report IS now sufficiently proximate to the boundary of the LSE to be deemed associated to the LSE. An alarm may be associated to an LSE by listing the alarm in the LSE master incident report.

In an embodiment, the incident management application can selectively present a wizard graphical user interface (GUI) screen for a network management worker for manually selecting alarmed network elements and/or cell sites for addition to the LSE (e.g., added to the LSE master incident report). The wizard GUI may provide a list of alarmed sites that are deemed candidates for consideration as associated with the LSE. The network management worker can drill down using the wizard GUI to learn more about the alarms active at the cell site and then select the cell site for inclusion in the LSE. This wizard GUI helps network management workers identify and add alarmed cell sites to the LSE master ticket without resorting to bulk selection approaches.

Turning now to FIG. 1, a communication system 100 is described. In an embodiment, the communication system 100 comprises a radio access network (RAN) 102, a plurality of operational support systems (OSSs) 104, a network 106, a cell site maintenance tracking system 108, an alarms configuration system 110, an automated alarms handling system 112 that executes an incident management application 114, a network operation center (NOC) dashboard system 116, an incident reporting system 118, and a data store 120.

The RAN 102 comprises a plurality of cell sites and backhaul equipment. In an embodiment, the RAN 102 comprises tens of thousands or even hundreds of thousands of cell sites. The cell sites may comprise electronic equipment and radio equipment including antennas. The cell sites may be associated with towers or buildings on which the antennas may be mounted. The cell sites may comprise a cell site router that provides a backhaul link from the cell sites to the network 106. The cell sites may provide wireless links to user equipment (e.g., mobile phones, smart phones, personal digital assistants, laptop computers, tablet computers, notebook computers, wearable computers, headset computers) according to a 5G, a long-term evolution (LTE), code division multiple access (CDMA), or a global system for mobile communications (GSM) telecommunication protocol. In an embodiment, the OSSs 104 comprises tens or even hundreds of OSSs. The network 106 comprises one or more public networks, one or more private networks, or a combination thereof. The RAN 102 may from some points of view be considered to be part of the network 106 but is illustrated separately in FIG. 1 to promote improved description of the system 100.

The cell site maintenance tracking system 108 is a system implemented by one or more computers. Computers are discussed further hereinafter. The cell site maintenance tracking system 108 is used to track maintenance activities on network elements (e.g., cell site equipment, routers, gateways, and other network equipment). When a network element (NE) is in maintenance, alarms that may occur on the NE may be suppressed, to avoid unnecessarily opening incident reports related to such alarms that may be generated because of unusual conditions the equipment may undergo pursuant to the maintenance activity. When a maintenance action is completed, maintenance personnel may be expected to check and clear all alarms pending on the subject NE before the end of the time scheduled for the maintenance activity. Sometimes a maintenance action may extend beyond the scheduled maintenance window, pending alarms are no longer suppressed (because the scheduled maintenance window has closed), and incident reports may be generated based on the alarms. This can lead to creation of undesired incident reports. It is preferred that maintenance personnel who cannot complete a maintenance task in the scheduled maintenance interval use the cell site maintenance tracking system 108 to extend the scheduled maintenance interval, whereby alarms do not spuriously result in creation of incident reports.

The alarm configuration system 110 is a system implemented by one or more computers. The alarm configuration system 110 allows users to define rules and instructions for handling alarms, for example rules for automatic processing of alarms by the automated alarms handling system 112. The alarm configuration system 110 may define rules for when an alarm leads to automatic generation of an incident report. The alarm configuration system 110 may define rules for how alarms are cleared.

Alarms are flowed up from NEs of the RAN 102 via the OSSs 104 to be stored in the data store 120. The NOC dashboard 116 can access the alarms stored in the data store 120 and provide a list of alarms on a display screen used by NOC personnel. NOC personnel can manually open incident reports on these alarms. The incident reporting system 118 can monitor the alarms stored in the data store 120 and automatically generate incident reports on these alarms based in part on the alarm configurations created and maintained by the alarms configuration system 110. For example, an alarm configuration rule defined by the alarm configuration system 110 may indicate that an incident report is not to be opened related to a specific alarm until the alarm has been active for a predefined period of time, for example for five minutes, for ten minutes, for fifteen minutes, for twenty minutes, for twenty-five minutes, or some other period of time less than two hours. The time criteria for auto generation of incident reports may be useful to avoid opening and tracking incidents that are automatically resolved by other components of the system 100, as described further hereinafter. Incident reports may be referred to in some contexts or by other communication service providers as tickets or trouble tickets.

In an embodiment, the incident reporting system 118 can determine that a plurality of alarms are related to a large scale event (LSE) and generate a master incident report that covers the LSE. Alarms that are deemed related to the LSE are documented in the LSE master incident report, and the alarm information stored in the data store 120 may be updated to indicate that these alarms are associated with the LSE and/or with the LSE master incident report. In an embodiment, the incident reporting system 118 may update incident reports documenting alarms that the incident reporting system 118 deem to be associated with an LSE by adding an indication into the incident report linking it to or associating it to the LSE master incident report. These incident reports that are linked to the LSE master incident report may be referred to as child incident reports.

The incident management application 114 may operate upon incident reports in a sequence of processes. In an embodiment, the incident management application 114 may perform automated triage on incident reports that includes automated enrichment of alarms and/or incident reports, automated dispatch to field operations personnel for some incident reports, and automated testing. Automated enrichment may comprise looking-up relevant information from a plurality of disparate sources and attaching this relevant information to the incident report. The looked-up information may comprise local environmental information such as weather reports, rainfall amounts, temperature, wind. The looked-up information may comprise logs of recent maintenance activities at the affected NE.

The automated triage process may involve determining a probable root cause for the incident and adding this to the incident report during the enrichment action. The probable root causes may be categorized as related to electric power, backhaul (e.g., transport), maintenance, or equipment (e.g., RAN hardware related), but within these general categories it is understood there may be a plurality of more precise probable root causes. The automated triage process can assign an incident report to personnel for handling based on its determination of the probable root cause of the incident report.

In an embodiment, the incident management application 114 may automatically close an incident report when NE status warrants such automated closure. Automated closure may happen because NOC personnel have taken manual corrective action to restore proper function of one or more NEs. Automated closure may happen because the incident management application 114 determines that the incident report was created pursuant to a maintenance action that extended beyond the scheduled maintenance interval and that the scheduled maintenance interval was later extended, but extended after a related incident report had already been generated. The incident management application 114 may perform automated remediation of alarm conditions associated with incident reports. For example, cell sites can be reset to restore operation and clear alarmed conditions. For example, cell sites can be locked and unlocked to restore operation and clear alarmed conditions. For example, cell sites may be resynched with GPS. For example, a software or firmware update may be pushed to cell sites.

The NOC dashboard 116 provides a system that NOC personnel can use to monitor health of a carrier network (e.g., monitor the RAN 102 and at least portions of the network 106), to monitor alarms, to drill down to get more details on alarms and on NE status, to review incident reports, and to take corrective actions to restore NEs to normal operational status. The NOC dashboard 116 may interact with the data store 120, with the cell site maintenance tracking system 108, the OSSs 104, the RAN 102, and other systems. NOC personnel can use the NOC dashboard 116 to manually create incident reports based on alarms reviewed in a user interface of the NOC dashboard 116.

When the incident management application 114 determines that alarms associated with a plurality of proximate cell sites or other NEs were generated at about the same time (e.g., within a predefined time interval, where the predefined time interval may expand over time after an LSE is initially declared) and are located geographically proximate to each other, the incident management application 114 can automatically deem that a large-scale event (LSE) is associated with these alarms. The incident management application 114 can automatically generate a master incident report to cover the LSE and can automatically link the associated alarms to the master incident report. The master incident report will be addressed in a holistic and coordinated manner, rather than each separate alarm related to the LSE being assigned to different incident reports and being handled by different personnel who handle each alarm separately and in an uncoordinated manner. Additionally, properly associating alarms to an LSE contributes to improved reporting to regulatory bodies and tasking responsible third parties and/or vendors with supporting and repairing their equipment.

It is understood that different definitions of an LSE can apply under different circumstances. In an embodiment, an LSE may be defined as the same alarm occurring at about the same time at six or more NEs in proximity to each other. A first NE may be said to be proximate to a second NE if it is within six hops of the second NE. Six "hops" in this context may be a jump from the coverage of a first cell site to the coverage area of a second cell site (first hop), from the coverage of the second cell site to the coverage area of a third cell site (second hop), from the coverage area of the third cell site to the coverage area of a fourth cell site (third hop), from the coverage area of the fourth cell site to the coverage area of a fifth cell site (fourth hop), from the coverage area of the fifth cell site to the coverage area of a sixth cell site (fifth hop), from the coverage area of the sixth cell site to the coverage area of a seventh cell site (sixth hop). Thus, any set of six NEs that have the same alarm raised at about the same time that can be linked to one of the set of six NEs by six hops or less may be deemed an LSE. The total hops of the boundary of the LSE may extend 42 hops—if all the NEs in the LSE are aligned in a line—but need not be.

An LSE identifying algorithm can be used to discover neighboring NEs that have the same alarm raised at about the same time. This can involve checking all NEs within six hops of a given NE in alarm for the same alarm. When another NE that qualifies is found, the algorithm can additionally check all NEs within six hops of the additional NE. This process of expanding the search for NEs having the same alarm within six hops or less of another NE having the subject alarm defines a boundary of the LSE.

A telecommunication service provider may subdivide its network into markets and task personnel to maintain the overall network in market segments. Thus, a first team may be assigned to maintain the network in a first market, a second team may be assigned to maintain the network in a second market, and so forth. A telecommunication service provider may subdivide a network spanning the United States with sixty or more markets. Sometimes LSEs extend across market boundaries. To support the market-directed maintenance of the network, in an embodiment, a separate master incident report may be generated for the same LSE in two or more different markets. Thus, a given LSE may be associated with a first master incident report associated with NEs located in a first market, a second master incident report associated with NEs located in a second market, and a third master incident report associated with NEs located in a third market. It is observed that sometimes LSEs spread across large areas due to a common weather event, such as due to a hurricane, due to a string of tornadoes, or due to freezing rain event.

Figure 2A:
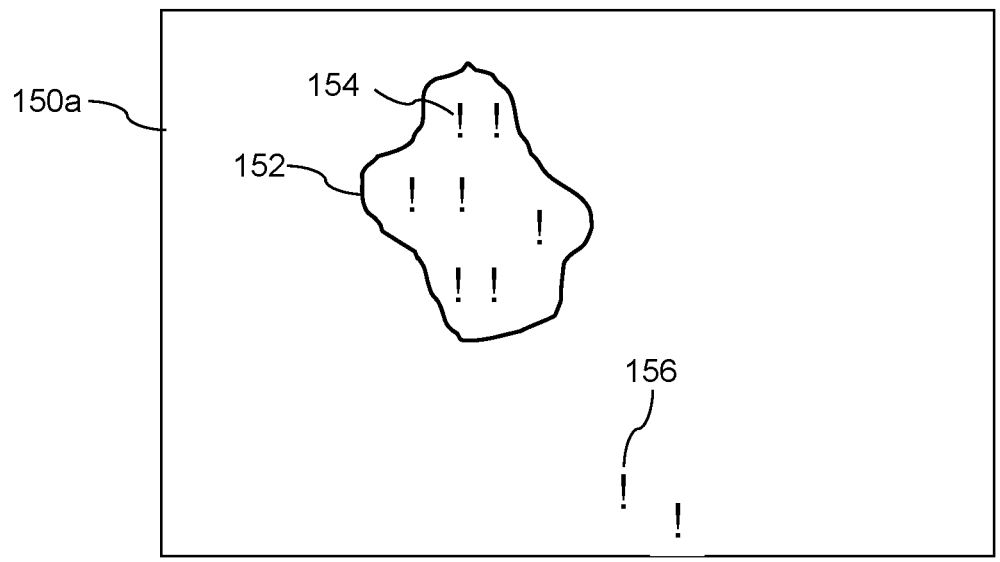
FIG. 2A and FIG. 2B are illustrations of a large-scale event (LSE) at a first time and at a later time as the LSE evolves according to an embodiment of the disclosure.

Turning now to FIG. 2A, a view 150a of a portion of the RAN 102 is illustrated. An LSE is defined that includes six alarms 154. The alarms 154 may be the same alarm identities associated with different NEs, for example associated with different cell sites. The alarms 154 may have started at about the same time, for example within 30 seconds of each other, within 1 minute of each other, within 5 minutes of each other, or within some other short interval of time. The alarms 154 are associated with NEs that are geographically proximate to each other. A boundary 152 is drawn around the NEs that are deemed affected by the LSE. Two alarms 156 may have the same alarm identity as the alarms 154 and may have started at about the same time as the alarms 154, but the two alarms 156 are associated with NEs that are separated by too great a physical distance from the boundary 152 of the LSE at the time represented in view 150a. The incident reporting system 118 may generate a master incident report associated with the LSE the references the alarms 154, a second incident report associated with a first one of the alarms 156, and a third incident report associated with a second one of the alarms 156.

Figure 2B:
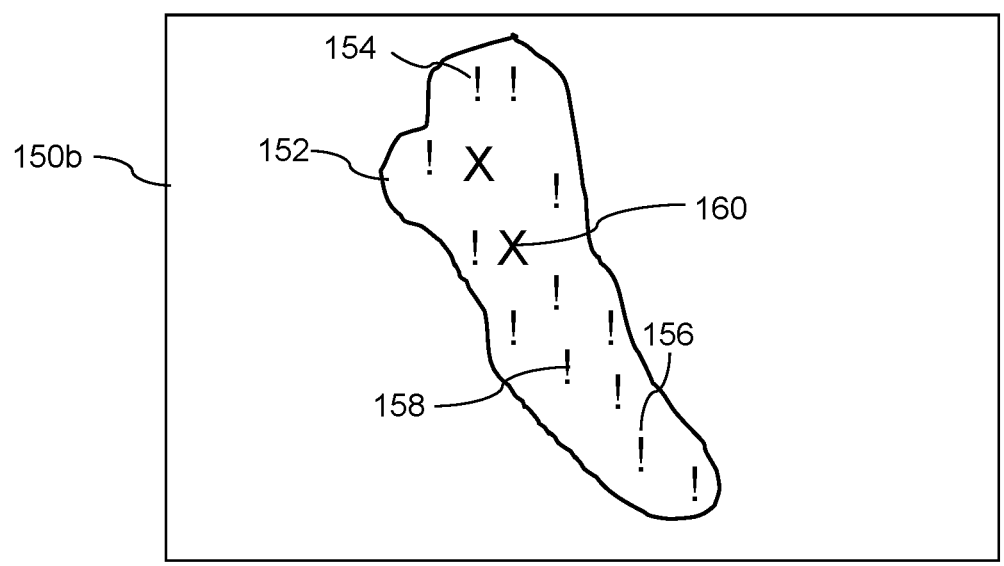

Turning now to FIG. 2B, a view 150b of the portion of the RAN 102 is illustrated at a later time. At the later time represented in FIG. 2B, four additional alarms 158 have started associated with NEs geographically between the boundary 152 in FIG. 2A and the alarms 156. The additional alarms 158, because they are sufficiently close to the boundary 152 and have the same alarm identity as the alarms 154, are deemed to be part of the same LSE. Because the previously existing alarms 156 have the same alarm identity as the alarms 154 and are now geographically proximate to an expanded boundary of the LSE, the previously existing alarms 156 are deemed at the time of the view 150b to be part of the LSE. The expanded boundary 152 of the LSE in FIG. 2B is shown enclosing alarms 154, 156, 158. Two of the previously existing alarms 154, represented in FIG. 2B by large "X" 160 indications, have been cleared. The expansion of a definition of an LSE over time, as illustrated in FIG. 2A and FIG. 2B, is common. A cause of an LSE may be some weather event, and different NEs may be affected at different times by the same weather event. Because the previously existing alarms 156 are now deemed associated with the LSE, the previously opened incident reports for the two alarms 156 may be linked to the master incident report associated with the LSE. The previously opened incident reports for the two alarms 156 may be deleted or they may be retained to provide continuity of reporting information and reassigned to personnel assigned to handle the master incident report.

With reference now to FIG. 1, FIG. 2A, and FIG. 2B, the incident management application 114 can periodically analyze alarms stored in the data store 120 and incident reports stored by the incident reporting system 118. The incident management application 114 can reanalyze to identify that a boundary 152 of an LSE is expanding and link or otherwise associate new alarms and/or previously existing alarms and incident reports to the LSE, for example by linking or associating to the LSE master incident report. The incident management application 114 can periodically analyze alarms stored in the data store 120 every five minutes, every ten minutes, every fifteen minutes, every twenty minute, every twenty-five minutes, every thirty minutes, or some other periodic time interval less than forty-eight hours. The time criteria for alarm initiation may be increased after the initial LSE is determined. For example, while on initial identification of an LSE may use a first time threshold for including alarms in an LSE, later a second time threshold may be used that is greater than the first time threshold. For example, the first time threshold may be five minutes and the second time threshold may be fifteen minutes. As the boundary 152 of the LSE expands, the incident management application 114 may use a third time threshold that is greater than the second time threshold, for example, a time threshold of forty-five minutes. The relaxation of the time threshold for alarm initiation for LSEs makes sense in that an LSE may begin first at a narrowly focused geographical location and then shift geographical location over time, for example as a string of severe thunderstorms progresses through a large regional area.

While the discussion of FIG. 2A and FIG. 2B is related to a single LSE, it is understood that the incident management application 114, the incident reporting system 118, and the NOC dashboard 116 may be coping with a plurality of isolated LSEs across a large network. For example, the incident management application 114 and incident reporting system 118 may be coping with a first LSE in Florida, a second LSE in the Boston area, a third LSE in Iowa, and a fourth LSE in the Seattle area. Each of these four LSEs may result from separate and unrelated local causes.

In an embodiment, the NOC dashboard 116 provides a user interface that allows a NOC worker to investigate an LSE. The user interface may provide access to an LSE wizard screen that lists incident reports related to NEs or cell sites located within the geographical boundary of the LSE but not yet associated to the given LSE master incident report. The wizard screen can also list cell sites within the geographical boundary of the LSE that are alarmed but do not yet have an incident report open (e.g., because incident reports are suppressed because the cell site is in maintenance status or because there is a time delay associated with auto-generation of the incident report that has not yet run). The LSE wizard screen provides a control input for associating such incident reports associated to NEs or cell sites located within the geographical boundary of the LSE to the LSE master incident report in a convenient, simple manner. The LSE wizard screen can also list cell sites that have alarms not yet reported in an incident report and provides a control input or control input sequence for opening an incident report on the cell site in alarm and for associating this new incident report to the LSE master incident report. In some contexts, the list of incident reports and/or cell sites in alarm presented in the LSE wizard screen may be referred to as a pick list.

The wizard screen may present a sequence of actions to be taken by a user (e.g., a NOC worker) including (1) select the master incident report, (2) select the child incident reports (e.g., one or more incident report to be subsumed under the master incident report), and (3) review/commit addition of child incident reports to the master incident report. To support the second action identified above (select child incident reports), the wizard screen may provide a pick-list of such incident reports to add to the LSE. The pick-list in the wizard screen may provide a drill-down function whereby NOC personnel can get further details on the subject child incident reports. When this pick-list is selected and activated (e.g., when reviewed and committed in the third action identified above), the incident management application 114, which is linked into the functionality of the user interface, can associate these incident reports to the LSE master incident report. This is a process that is essentially the same as the automated process except initiated manually by the NOC employee through the wizard screen. Some of the incident reports suggested for addition to the LSE by the wizard screen may be associated with NEs in maintenance status and hence NEs that have alarms suppressed at the current time but which could be expected to suffer from the same alarm condition of other proximate NEs that have been affected by the LSE.

Workers are assigned to resolve the master incident report and take various actions to fix the associated alarms and bring the NEs involved in the master incident report back into fully functioning condition. This may involve dispatching field operations personnel to go to cell sites to perform maintenance such as deicing antennas or removing snow accumulated in parabolic dish antennas used in backhaul. This may involve in dispatching field operations personnel to go to cell sites to install battery packs or to install a mobile generator. This may involve informing a third-party vendor to provide emergency power to one or more NEs. It is understood that there are a large variety of repairs that may be performed to restore the NEs involved in the master incident report to fully functioning order, but that the appropriate association of alarms and incident reports to a master incident report for an LSE helps to complete this fix in a holistic and coordinated manner that saves time and brings the NEs back on line more promptly. Additionally, the appropriate association of alarms and incident reports to a master incident report promotes more accurate reporting to regulatory authorities on communication outages and more accurate financial dealings with third-party vendors.

Figure 3:
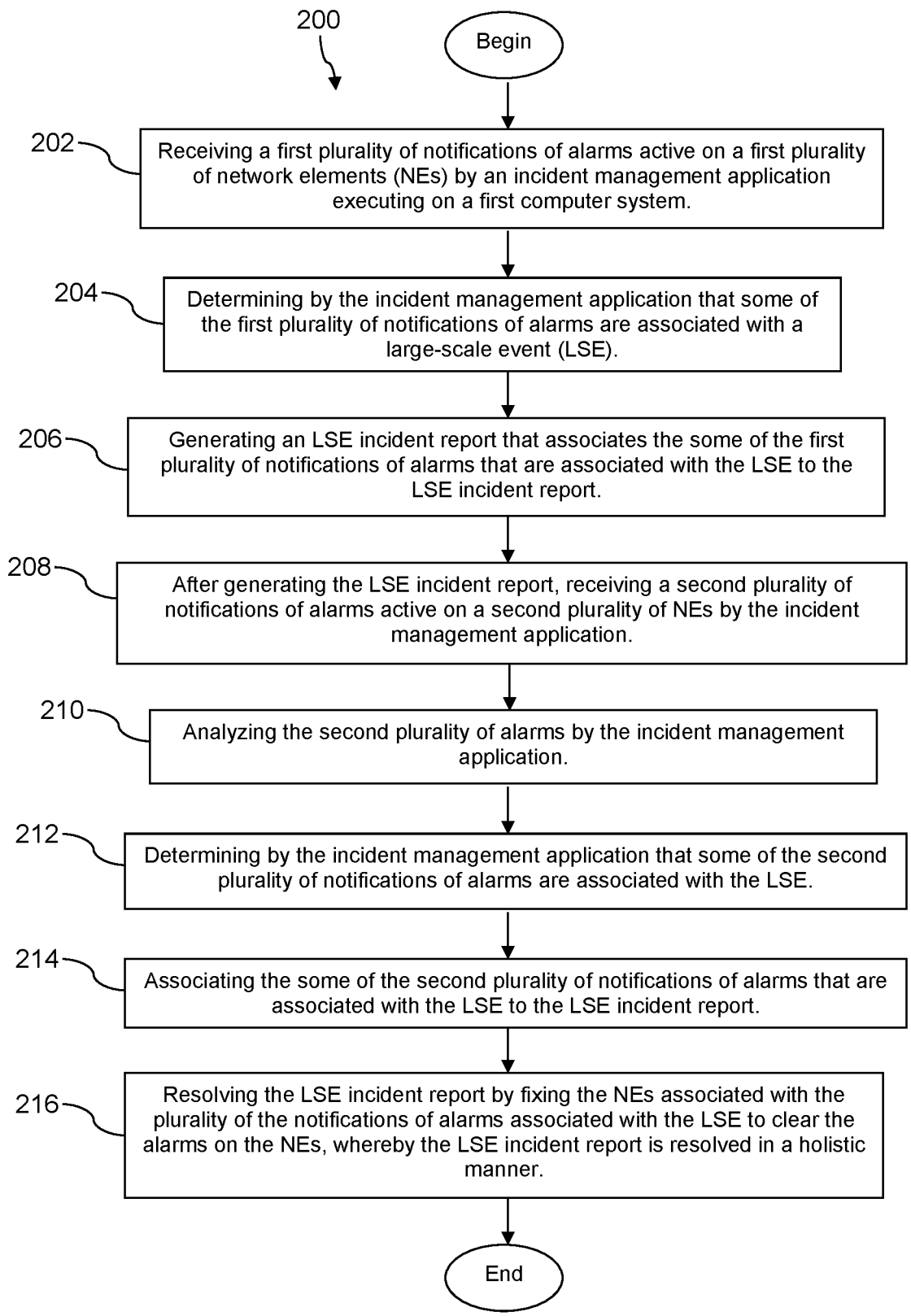
FIG. 3 is a flow chart of a method according to an embodiment of the disclosure.

Turning now to FIG. 3, a method 200 is described. In an embodiment, the method 200 is a method of maintaining a communication network providing communication services to subscribers. At block 202, the method 200 comprises receiving a first plurality of notifications of alarms active on a first plurality of network elements (NEs) by an incident management application executing on a first computer system. In an embodiment, at least some of the NEs are cell sites. A cell site may be referred to as a cell tower and comprises electronic equipment and one or more antennas. Some cell sites comprise a structure that supports the one or more antennas at a height above the ground such as a metal tower or building or water tower. In an embodiment, some of the NEs are routers.

At block 204, the method 200 comprises determining by the incident management application that some of the first plurality of notifications of alarms are associated with a large-scale event (LSE). In an embodiment, the incident management application identifies the LSE based on proximity of NEs having active alarms, the similarity of alarms between the proximate NEs, and the time the alarms were generated by the NEs. At block 206, the method 200 comprises generating an LSE incident report that associates the some of the first plurality of notifications of alarms that are associated with the LSE to the LSE incident report.

At block 208, the method 200 comprises, after generating the LSE incident report, receiving a second plurality of notifications of alarms active on a second plurality of NEs by the incident management application. At block 210, the method 200 comprises analyzing the second plurality of alarms by the incident management application. At block 212, the method 200 comprises determining by the incident management application that some of the second plurality of notifications of alarms are associated with the LSE.

At block 214, the method 200 comprises associating the some of the second plurality of notifications of alarms that are associated with the LSE to the LSE incident report. At block 216, the method 200 comprises resolving the LSE incident report by fixing the NEs associated with the plurality of the notifications of alarms associated with the LSE to clear the alarms on the NEs, whereby the LSE incident report is resolved in a holistic manner.

In an embodiment, the method 200 further comprises presenting an LSE graphical user interface (GUI) wizard screen that presents a pick-list of cell sites proximate to the LSE, where the pick-list of cell sites proximate to the LSE comprise cell sites having at least one active alarm; receiving an input by the incident management application from the LSE GUI wizard screen selecting some of the cell sites presented in the pick-list; and associating the cell sites presented in the pick-list that were identified as selected in the input to the LSE incident report by the incident management application. In an embodiment, the pick-list of cell sites proximate to the LSE comprises cell sites that are in maintenance status. In an embodiment, the pick-list of cell sites proximate to the LSE presented by the GUI wizard screen provides access to drill-down information for each cell site in the pick-list.

In an embodiment, the processing of method 200 further comprises fixing the NEs associated with the LSE in a coordinated manner.

In an embodiment, the incident management application analyzes alarms associated with a plurality of independent LSEs across the communication network. Thus, the processing described above with referent to method 200 may be repeated for each of a plurality of independent LSEs at different locations of the communication network. For example, a first LSE may be defined in Florida, a second LSE may be defined in the Boston area in Massachusetts, a third LSE may be defined in Iowa, and a fourth LSE may be defined in the Seattle area in Washington. The method 200 may cope with any number of concurrent LSEs.

Figure 4:
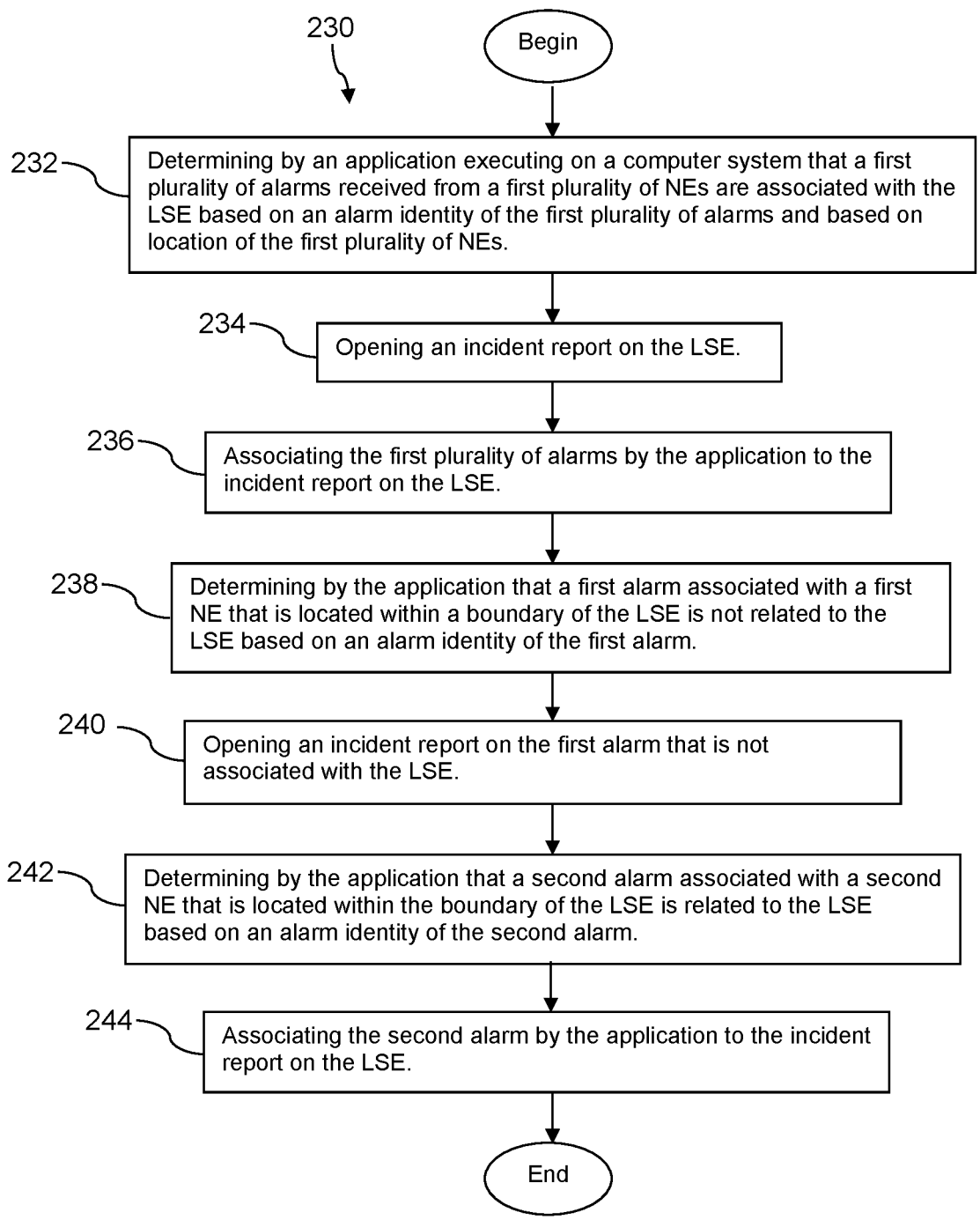
FIG. 4 is a flow chart of another method according to an embodiment of the disclosure.

Turning now to FIG. 4, a method 230 is described. In an embodiment, the method 230 is a method of maintaining a communication network by associating incident reports associated with different network elements (NEs) to a large-scale event (LSE). At block 232, the method 230 comprises determining by an application executing on a computer system that a first plurality of alarms received from a first plurality of NEs are associated with the LSE based on an alarm identity of the first plurality of alarms and based on location of the first plurality of NEs. In an embodiment, the NEs comprise cell sites. In an embodiment, the NEs comprise routers.

At block 234, the method 230 comprises opening an incident report on the LSE. In an embodiment, when the LSE spans two markets, two incident reports on the LSE are opened, one for each of the two markets. When the LSE spans three markets, three incident reports on the LSE are opened. At block 236, the method 230 comprises associating the first plurality of alarms by the application to the incident report on the LSE.

At block 238, the method 230 comprises determining by the application that a first alarm associated with a first NE that is located within a boundary of the LSE is not related to the LSE based on an alarm identity of the first alarm. At block 240, the method 230 comprises opening an incident report on the first alarm that is not associated with the LSE.

At block 242, the method 230 comprises determining by the application that a second alarm associated with a second NE that is located within the boundary of the LSE is related to the LSE based on an alarm identity of the second alarm. At block 244, the method 230 comprises associating the second alarm by the application to the incident report on the LSE.

In an embodiment, the method 230 further comprises identifying an NE located within the boundary of the LSE that is in maintenance mode by the application; presenting the NE in a pick list in a user interface; receiving a selection of the NE from the pick list by the application; and adding the NE that is in maintenance mode to the incident report on the LSE. In an embodiment, the incident report on the LSE is duplicated when the boundary of the LSE spans two markets. In an embodiment, the application operates on a plurality of different LSEs at the same time. In an embodiment, the method 230 comprises fixing the NEs associated with the first plurality of alarms and the second alarm in a coordinated manner.

Figure 5A:
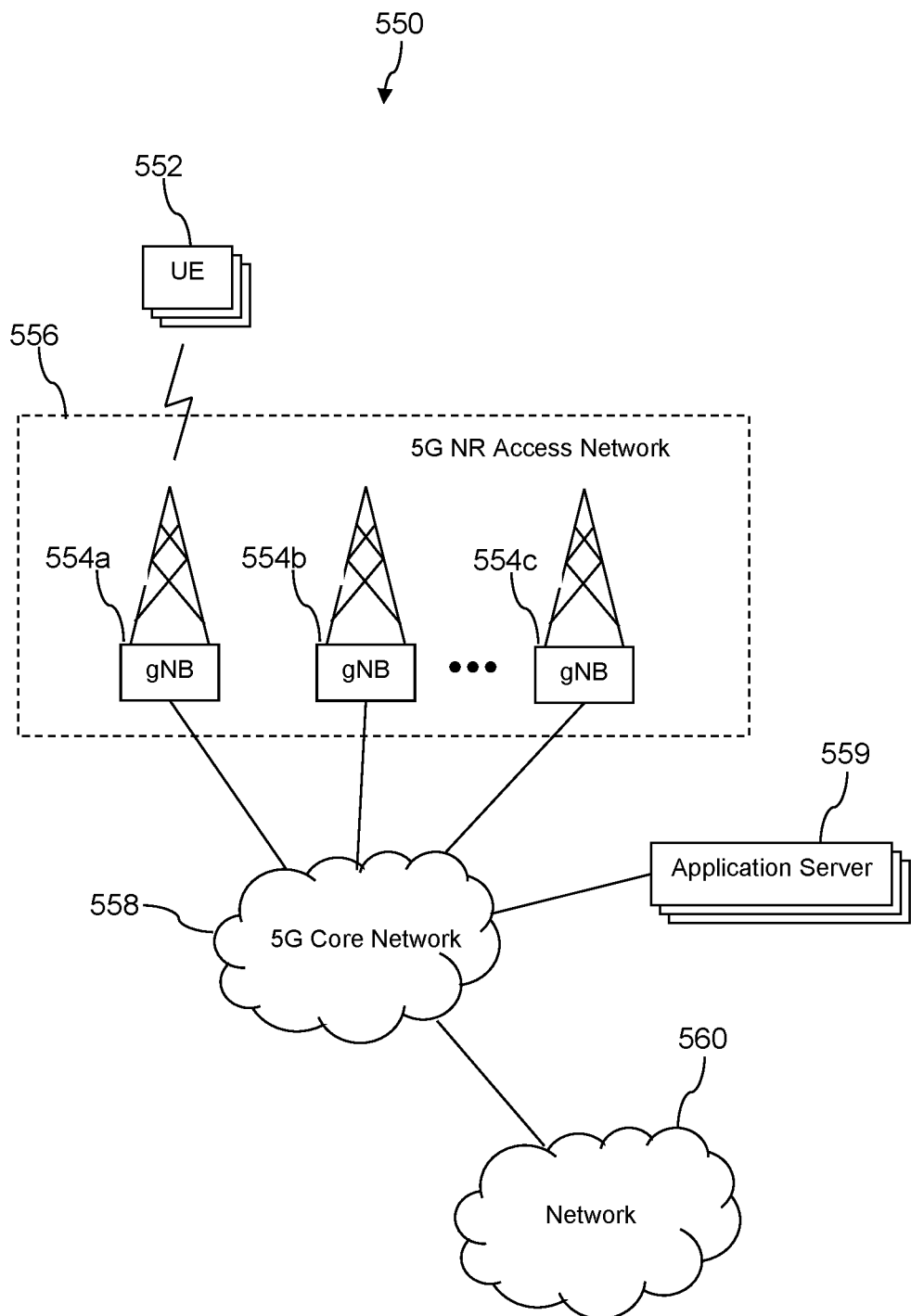
FIG. 5A and FIG. 5B are block diagrams of a 5G network according to an embodiment of the disclosure.
Figure 5B:
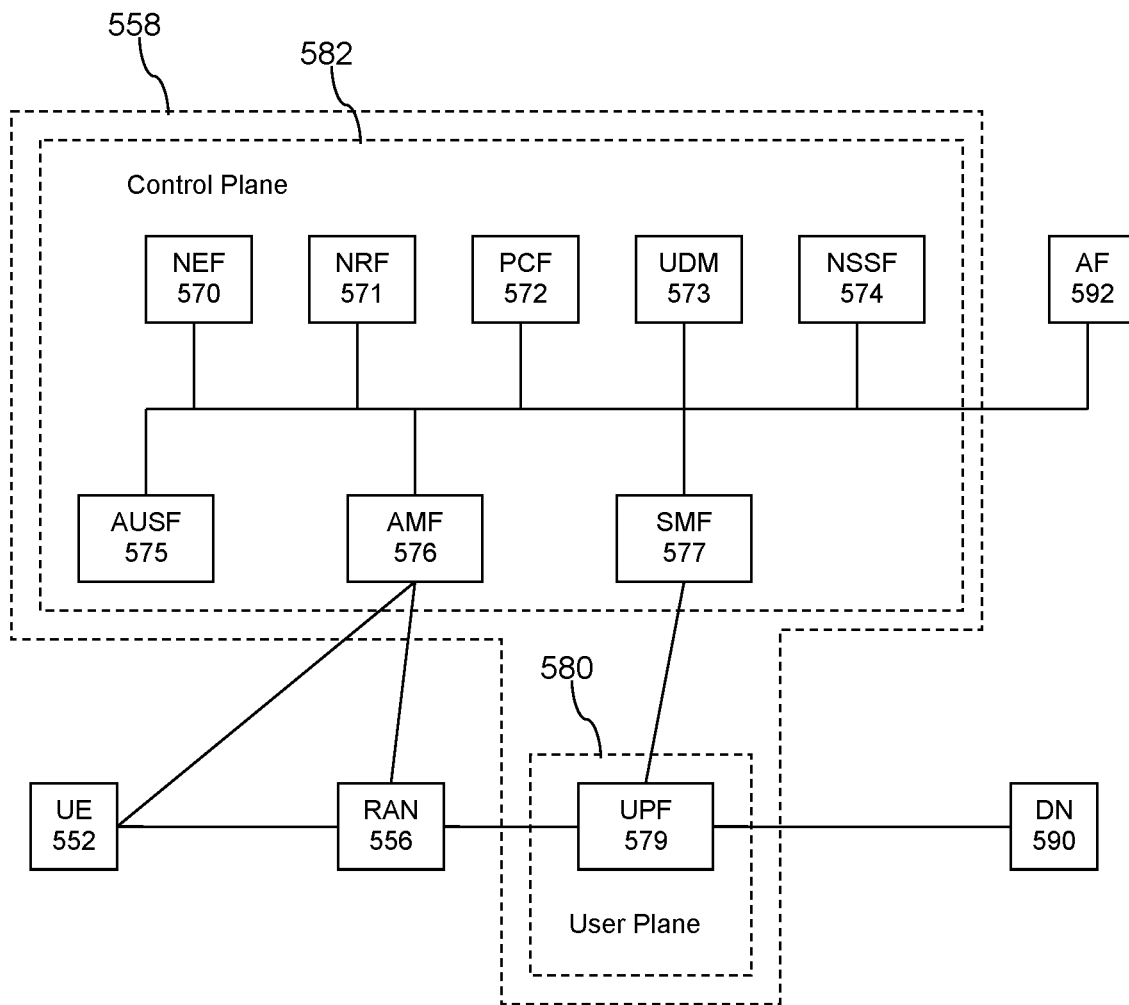

Turning now to FIG. 5A, an exemplary communication system 550 is described. Typically the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a next Generation Node B (gNB). In 4G technology (e.g., long term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHZ), and/or other features, to support higher data rates and countless applications, such as mission-critical services, enhanced mobile broadband, and massive Internet of Things (IOT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IOT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Turning now to FIG. 6B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 5A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be executed on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 6:
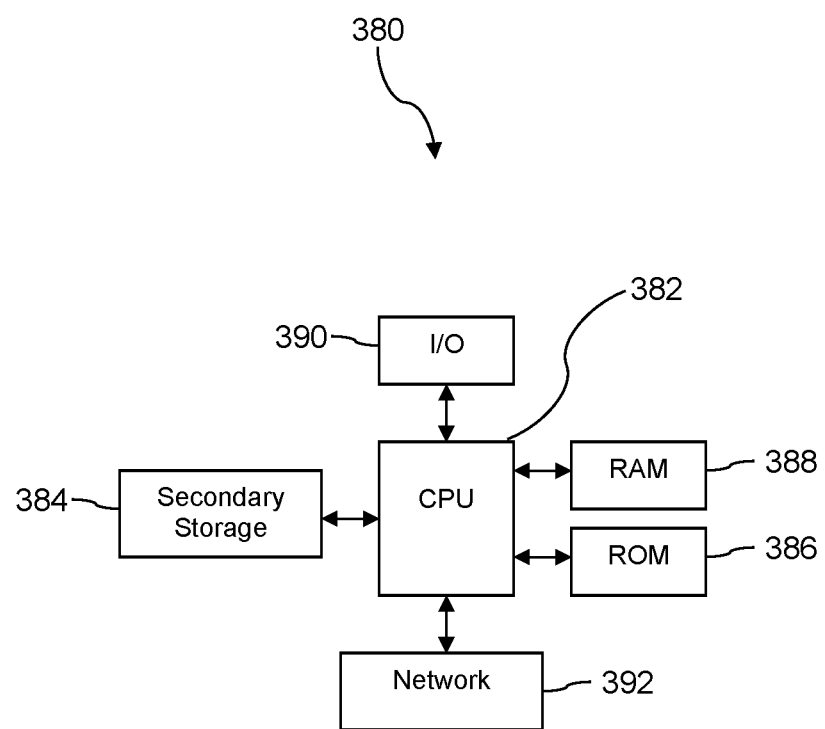
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media. I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A telecommunication network management system, comprising:
    an incident reporting application executing on a first computer system, wherein the incident reporting application creates incident reports pursuant to alarms on network elements of a telecommunication network and wherein one of the incident reports is associated with a large-scale event (LSE), wherein the LSE incident report identifies alarms at a plurality of different network elements as associated with the LSE, and wherein a LSE is an externally occurring event in which multiple NEs experience alarms traceable to a common cause; and
    an incident management application that executes on a second computer system, wherein the incident management application analyzes alarms on a plurality of network elements that are not yet associated with the LSE incident report and, based on analyzing a first alarm on a first network element of the plurality of network elements not yet associated with the LSE incident report, based on a location of the first network element, and based on the alarms associated with the LSE incident report, modifies the LSE incident report to associate the first alarm to the LSE.

2. The system of claim 1, wherein the LSE incident report is a master incident report.

3. The system of claim 1, wherein the LSE incident report identifies at least six different network elements that have similar alarms that were raised within about fifteen minutes of each other and that are within a predefined proximity of each other.

4. The system of claim 1, wherein the network elements comprise one or more cell sites.

5. The system of claim 1, wherein the incident management application presents a pick list of incident reports on cell sites proximate to the LSE that are not currently associated to the LSE incident report in a user interface screen for manually associating an incident report selected from the pick list to the LSE incident report.

6. The system of claim 5, wherein at least one network element presented in the pick list of network elements includes a cell site that is in maintenance status and for which alarms are currently suppressed and for which an alarm is expected to be active as a result of the LSE when the network element is returned to operation status from maintenance status.

7. The system of claim 1, wherein the incident reporting application creates multiple LSE incident reports that are geographically isolated from each other, and wherein the incident management application operates on multiple LSE incident reports.

8. A method of maintaining a communication network providing communication services to subscribers, comprising:
    receiving a first plurality of notifications of alarms active on a first plurality of network elements (NEs) by an incident management application executing on a first computer system;
    determining by the incident management application that some of the first plurality of notifications of alarms are associated with a large-scale event (LSE), wherein a LSE is an externally occurring event in which multiple NEs experience alarms traceable to a common cause;
    generating an LSE incident report that associates the some of the first plurality of notifications of alarms that are associated with the LSE to the LSE incident report;
    after generating the LSE incident report, receiving a second plurality of notifications of alarms active on a second plurality of NEs by the incident management application;
    analyzing the second plurality of alarms by the incident management application;
    determining by the incident management application that some of the second plurality of notifications of alarms are associated with the LSE;
    associating the some of the second plurality of notifications of alarms that are associated with the LSE to the LSE incident report; and
    resolving the LSE incident report by fixing the NEs associated with the plurality of the notifications of alarms associated with the LSE to clear the alarms on the NEs, whereby the LSE incident report is resolved in a holistic manner.

9. The method of claim 8, wherein at least some of the first plurality of NEs are cell sites.

10. The method of claim 8, further comprising:
    presenting an LSE graphical user interface (GUI) wizard screen that presents a pick-list of cell sites proximate to the LSE, where the pick-list of cell sites proximate to the LSE comprise cell sites having at least one active alarm;
    receiving an input by the incident management application from the LSE GUI wizard screen selecting one of the cell sites presented in the pick-list;
    opening a user interface by the LSE GUI wizard screen for creating a child incident report on the selected one of the cell sites; and
    creating a child incident report on the selected one of the cell sites that is linked to the LSE incident report.

11. The method of claim 10, wherein the pick-list of cell sites proximate to the LSE comprises cell sites that are in maintenance status.

12. The method of claim 10, wherein the pick-list of cell sites proximate to the LSE by the GUI wizard screen provides access to drill-down information for each cell site in the pick-list.

13. The method of claim 8, wherein the incident management application identifies the LSE based on proximity of NEs having active alarms, the similarity of alarms between the proximate NEs, and the time the alarms were generated by the NEs.

14. The method of claim 8, wherein the incident management application analyzes alarms associated with a plurality of independent LSEs across the communication network.

* * * * *